Sept. 1, 1942.  C. R. LEMONIER  2,294,467
LANDING GEAR
Filed July 20, 1940   2 Sheets-Sheet 2

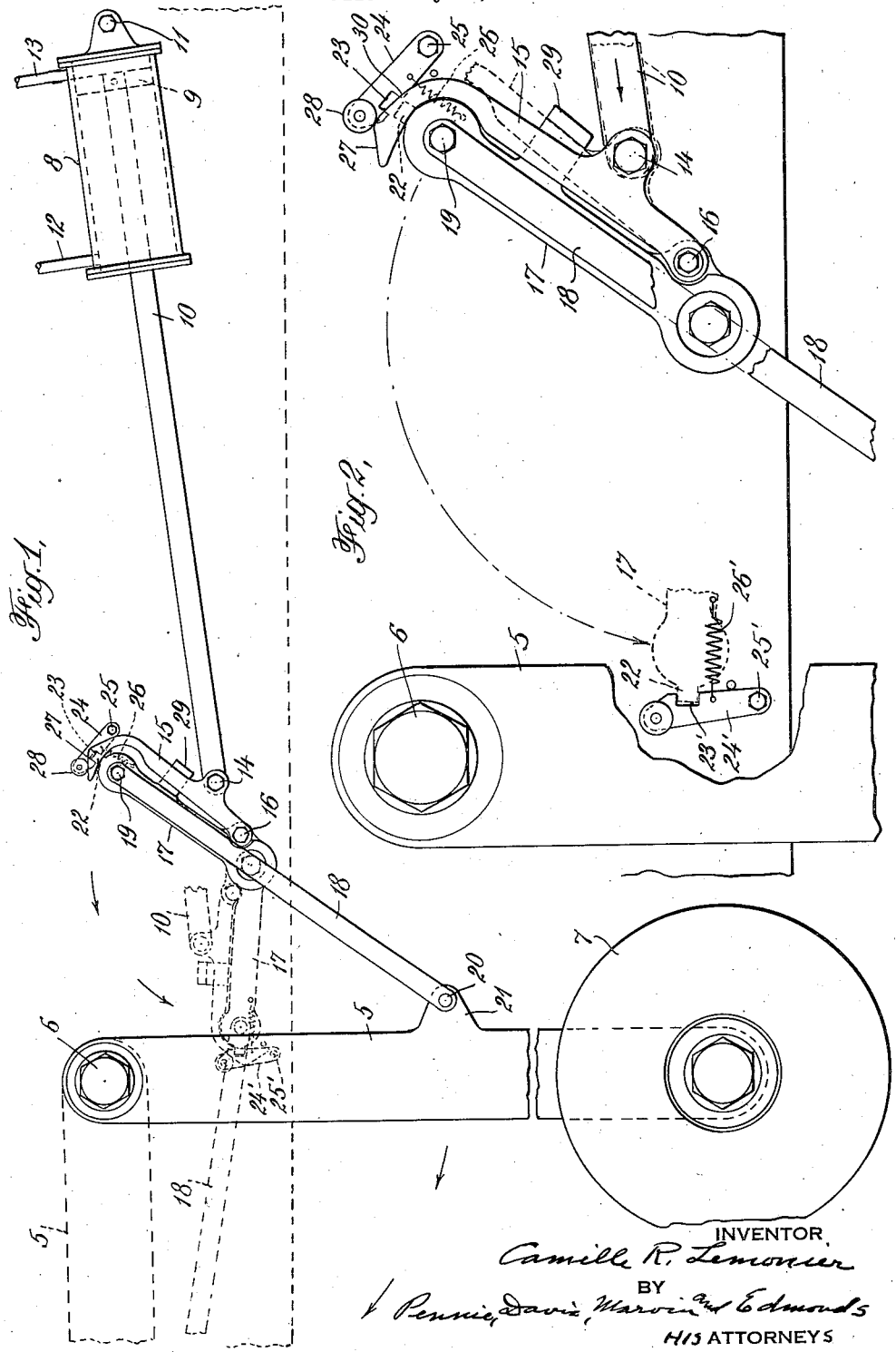

INVENTOR
Camille R. Lemonier
BY Pennie, Davis, Marvin and Edmonds
his ATTORNEYS

Patented Sept. 1, 1942

2,294,467

UNITED STATES PATENT OFFICE 2,294,467

LANDING GEAR

Camille Robert Lemonier, Bristol, Pa., assignor to Fleetwings, Inc., Bristol, Pa., a corporation of Delaware Application July 20, 1940, Serial No. 346,533

10 Claims. (Cl. 244—102)

This invention relates to retractable landing gear for aeroplanes and particularly to safety devices incorporated in the mechanism, whereby the landing gear is securely locked in extended and retracted positions.

In modern aeroplanes, landing gear of the retractable type is commonly employed. The landing gear is actuated by hydraulic mechanism adapted to move under the influence of fluid pressure to shift the landing gear as required. It is desirable to lock the landing gear when it is either extended or retracted so that it cannot move from either position until the operator of the plane manipulates the controls to effect desired movement. Various expedients have been attempted in an effort to afford satisfactory and safe locking mechanism which will be released promptly at the proper time, but which otherwise will hold the landing gear securely in the desired position. The effort to afford satisfactory mechanism has not been entirely successful, and the devices heretofore suggested have been deficient in the matter of security against accidental release of the landing gear. Serious accidents have occurred because of the failure of such mechanism.

It is the object of the present invention to afford a simple and effective device which will securely hold the landing gear either in retracted or extended position, as the case may be, and which will be released promptly and only when the hydraulic mechanism becomes effective to move the landing gear, under the control of the operator.

Another object of the invention is the provision of a self-locking device which will immediately lock the landing gear when it reaches the end of its travel, either in extended or retracted position, and which will be automatically released only when the hydraulic actuating mechanism has been set in motion to move the landing gear.

Other objects and advantages of the invention will be apparent as it is better understood by reference to the following specification and the accompanying drawings, in which Fig. 1 is a side elevation of the landing gear in extended position, and the actuating and locking mechanism therefor, with the locking mechanism effective to prevent movement of the landing gear;

Fig. 2 is an enlarged detail in elevation showing the locking mechanism at the moment when it is released preliminary to movement of the landing gear to retracted position;

Figure 3:
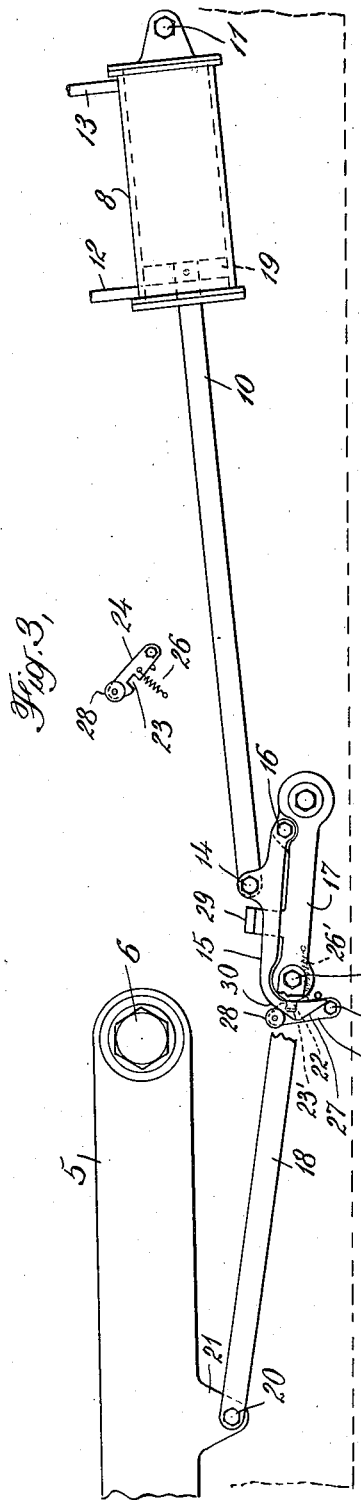
Fig. 3 is an elevation similar to Fig. 1 in which the landing gear is locked in retracted position.

Referring to the drawings, 5 indicates a wheel strut which is pivotally mounted at 6 on any convenient support provided in the plane. The strut 5 carries the wheel 7 which affords rolling support for the plane. The strut 5 and wheel 7 may be of any ordinary construction, with the usual cushioning devices (not shown).

Movement of the wheel strut 5 is effected by means of a hydraulic cylinder 8 enclosing a piston 9 connected to a piston rod 10. The cylinder 9 is pivoted at 11 on any suitable support connected with the plane, and fluid under pressure is supplied and withdrawn to and from the cylinder through pipes 12 and 13 from any suitable source under the control of the operator, permitting the piston 9 to move in both directions to actuate the wheel strut.

The piston rod 10 is pivotally connected at 14 to an arm 15 which is in turn pivoted at 16 to a lever 17, which is pivotally mounted on any suitable support connected with the plane. A retracting link 18 is pivoted at 19 on the lever 17 and at 20 on a bracket 21 secured to the strut 5.

A tooth 22 is provided at the end of the lever 17 and is adapted to be engaged in a recess 23 formed in a dog 24 which is pivoted at 25 on any suitable support connected to the plane and is biased by a spring 26 which is connected to the support. The arm 15 is provided with a cam surface 27 which is adapted to engage a roller 28 at the end of the dog 24.

When the strut 5 is in extended position, the tooth 22 is engaged in the recess 23 and movement of the strut 5 is thereby prevented, the strut being firmly locked in the position indicated in the drawings. It can be released only by lifting the dog 24 so as to release the tooth 22 from the engaging recess.

When the operator desires to retract the landing gear, he actuates suitable controlling mechanism (not shown) directing fluid through the pipe 13 into the cylinder 8 and thus actuating the piston 9. Upon the initial movement of the piston rod 10, the cam surface 27 rides under the roller 28, thus lifting the dog 24 and freeing the tooth 22 from the recess 23 therein. Upon further movement of the piston rod 10, the arm 15 engages the lever 17 and moves it to the dotted position as indicated in Fig. 1, whereupon the retracting link 18 lifts the strut 5 to its retracted position, and the tooth 22 engages the recess 23' in a dog 24' which is pivotally mounted at 25' on a suitable support connected to the plane and biased by a spring 26'. The strut 5 is thus locked in retracted position and cannot be released again until the operator actuates the control mechanism to drive the piston 9 in the reverse direction.

Figure 4:
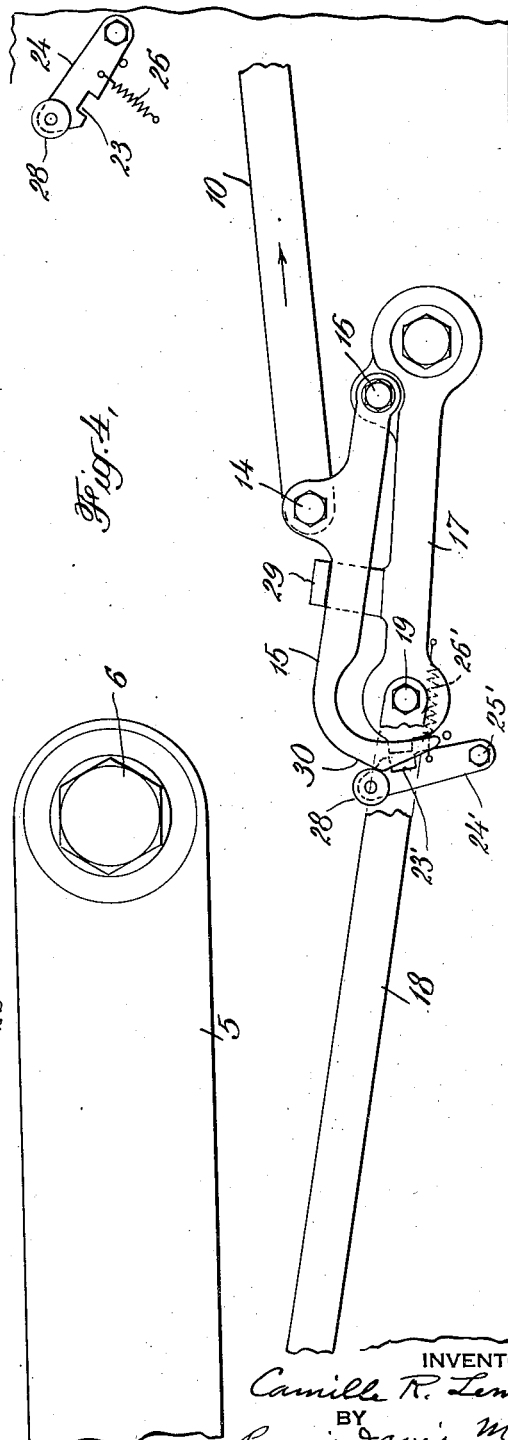
Fig. 4 is an enlarged detail similar to Fig. 2, showing the locking mechanism at the moment when it is released preliminary to movement of the landing gear from retracted position.

The link 17 is provided with a yoke 29 which embraces the arm 15. Upon the initial movement of the piston 9 to extend the landing gear, the arm 15 is moved into engagement with the yoke 29 as shown in Fig. 4. During this movement, the roller 28 moves up the cam surface 30 on the arm 15, and the dog 24' is lifted, thus releasing the tooth 22 from the recess 23'. The strut 5 is then free to move under the influence of the piston 9, and the connecting links, and is caused to travel again to the position indicated in Fig. 1, where it is again locked securely in extended position by the dog 24. The lost motion afforded by the pivoted arm 15 permits initial movement of the piston rod sufficient to release the locking devices before movement of the wheel strut is effected.

As will be seen from the foregoing description, the locking mechanism is fully automatic and secure. When the strut carrying the wheel reaches the end of its travel in either direction, it is immediately locked in the intended position and can be released therefrom only when the actuating mechanism for the strut is operative to move it from one position to the other. Immediately the mechanism for moving the strut goes into operation, the locking mechanism is released and the strut is then moved to its intended position. The inherent danger resulting from the provision of locking mechanism which is independent of the strut-actuating mechanism is entirely eliminated, and possible accidents are avoided because the operator cannot accidentally release the locking mechanism without first putting into operation the means for moving the wheel strut from one position to the other.

It is to be understood that whereas the mechanism has been described with reference to a single wheel strut, it is duplicated with each wheel strut. The controlling mechanism (not shown) may be co-ordinated in the usual manner to ensure the movement of both wheels simultaneously, the wheels being otherwise securely held in the desired position, that is to say, either retracted or extended, until the operator desires to effect a change.

Various changes may be made in the details of construction and arrangement of the parts without departing from the invention or sacrificing any of the advantages thereof.

I claim:

1. An actuating and locking mechanism for retractable landing gear comprising a pivoted wheel strut, hydraulic actuating means including a piston rod and means releasable only by movement of the piston rod for locking the wheel strut at the extremity of its travel in both directions, including resiliently biased dogs, rollers carried by said dogs, means adapted for engagement with said rollers and a lost motion connection between the piston rod and wheel strut, having cam surfaces adapted to lift the roller and the dog which is engaged during the initial movement of the piston rod.

2. An actuating and locking mechanism for retractable landing gear comprising a pivoted wheel strut, hydraulic actuating means including a piston rod and means releasable only by movement of the piston rod for locking the wheel strut at the extremity of its travel in both directions, including resiliently biased dogs, rollers carried by said dogs, means adapted for engagement with said rollers and a lost motion connection comprising a pivoted lever and an arm pivotally mounted thereon between the piston rod and wheel strut, the arm having cam surfaces adapted to lift the roller and the dog which is engaged during the initial movement of the piston rod.

3. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, a cam for moving against one of said parts and forcing it out of engagement with the other part, and means so connecting said cam with the piston rod that initial movement of the piston rod in a direction to actuate the wheel strut causes the cam to disengage said engaging parts before the wheel strut is actuated.

4. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, an arm connected to the piston rod and having a cam surface engaging one of said parts, said cam surface, on initial actuation of the piston rod in a direction to actuate the wheel strut, being moved against one of said parts to disengage it from the other part before the wheel strut is actuated.

5. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, one of said parts being pivoted and having a cam surface, the means connecting the piston rod and wheel strut including an arm pivoted to the piston rod and having a cam adapted to bear against the cam surface of said interengaging part, the cam on said arm, on initial actuation of the piston rod in a direction to actuate the wheel strut, being moved to engage the cam surface of said pivoted part and lift its interengaging part from engagement with the other part.

6. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, one of said parts being a resiliently biased dog, a roller carried by said dog, the means connecting said piston rod and said wheel strut including an arm pivotally connected to the piston rod, said arm having a cam adapted to engage said roller, and a lost motion connection for said arm, said lost motion connection causing said arm to engage said roller when the piston rod moves in a direction to actuate the wheel strut and to swing the biased dog to disengage it from the other part before the wheel strut is actuated.

7. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, said connecting means including a link pivotally connected to the wheel strut, a lever pivotally connected to said link, and an arm pivotally connected to said lever and to the piston rod, interengaging parts for locking the wheel strut at the extremity of its travel in one direction, and cam means carried by said arm and actuated by initial movement of the piston rod in a direction to actuate the wheel strut for camming one of said interengaging parts out of engagement with the other part before the wheel strut is actuated.

8. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, said connecting means including a link pivotally connected to the wheel strut, a lever pivotally connected to said link, and an arm pivotally connected to said lever and to the piston rod, interengaging parts for locking the wheel strut at the extremity of its travel in one direction, one of said interengaging parts being a biased dog, a roller carried by the dog, and cam means carried by said arm and actuated by initial movement of the piston rod in a direction to actuate the wheel strut for engaging the roller and camming the dog out of engagement with the other part before the wheel strut is actuated.

9. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, said connecting means including a link pivotally connected to the wheel strut, a lever pivotally connected to said link, and an arm pivotally connected to said lever and to the piston rod, said arm having a free end normally spaced from a part of said lever, but adapted, on actuation of the piston rod in a direction to actuate the wheel strut, to engage said part of the lever to transmit movement of the piston rod thereto, interengaging parts for locking the wheel strut at the extremity of its travel in one direction, cam means carried by said arm and engageable with one of said interengaging parts for moving it out of engagement with the other part when the piston rod moves to actuate the wheel strut, the spacing of said arm from the lever providing a lost motion enabling the interengaging parts to be disengaged before the wheel strut is actuated.

10. An actuating and locking mechanism for retractable landing gear comprising a pivoted wheel strut, hydraulic actuating means including a piston rod and means connecting the piston rod and wheel strut, interengaging parts for locking the wheel strut at the extremity of its travel in one direction, a locking member carried by the means connecting the piston rod and the wheel strut, a first cooperating locking member, a second cooperating locking member, the first cooperating locking member being engageable with the locking member carried by the connecting means when the wheel strut is at its extreme retracted position, the second cooperating locking member being engageable with the locking member carried by the connecting means when the wheel strut is at its extreme extended position, an arm connected to the piston rod having a pair of cam surfaces, one of said cam surfaces, upon initial movement of the piston rod to retract the wheel strut, engaging the first cooperating locking member and disengaging it from the locking member carried by the connecting means, and the other of said cam surfaces, upon initial movement of the piston rod to extend the wheel strut, engaging the second cooperating locking member and disengaging it from the locking member carried by the connecting means, said arm having a lost motion when moving to disengage either of said cooperating members which enables it to disengage said members before the wheel strut is actuated.

CAMILLE ROBERT LEMONIER.